United States Patent [19]
Wolf

[11] 4,050,318
[45] Sept. 27, 1977

[54] SIDEREAL RATE DRIVE MECHANISM FOR A TELESCOPE MOUNT

[76] Inventor: Kenneth J. Wolf, 3727 W. Wilson, Chicago, Ill. 60645

[21] Appl. No.: 575,787

[22] Filed: May 8, 1975

[51] Int. Cl.² ............................................. F16H 27/02
[52] U.S. Cl. ..................................... 74/89.15; 350/83
[58] Field of Search ........................... 74/59.15; 350/83

[56] References Cited

U.S. PATENT DOCUMENTS

| | | | |
|---|---|---|---|
| 836,771 | 11/1906 | Lohmann | 350/83 |
| 2,104,151 | 1/1938 | Brisbane et al. | 74/89.15 |
| 2,326,552 | 8/1943 | Morse | 350/83 |
| 2,920,871 | 1/1960 | Kolodin | 74/89.15 |
| 3,545,837 | 12/1970 | Chapman | 350/83 |

*Primary Examiner* — Samuel Scott
*Assistant Examiner* — Wesley S. Ratliff, Jr.
*Attorney, Agent, or Firm* — Hibben, Noyes & Bicknell, Ltd.

[57] ABSTRACT

This disclosure deals with a mount for a telescope, and particularly to a mechanism for moving the telescope at the sidereal rate. The mount includes a polar shaft and a sleeve for supporting the polar shaft, the sleeve being fixed in position and the polar shaft being rotatable in the sleeve. A declination shaft support member is secured to the polar shaft, and a declination shaft is rotatably mounted on the support member. To turn the polar shaft relative to the sleeve at the sidereal rate, two arms are provided, one arm being secured to and extending outwardly from the polar shaft and the other arm being secured to and extending outwardly from the sleeve but in a different direction. A motor driven adjusting mechanism connects the outer ends of the two arms and changes the angle between the two arms, and thus rotates the polar shaft, at about the sidereal rate. A manually adjustable device is also connected between the motor driven mechanism and one of the arms and enables an adjustment to be made of the effective length of one of the arms, thereby making the mechanism capable of turning the polar shaft at slightly different rates.

7 Claims, 11 Drawing Figures

U.S. Patent    Sept. 27, 1977    Sheet 1 of 2    4,050,318
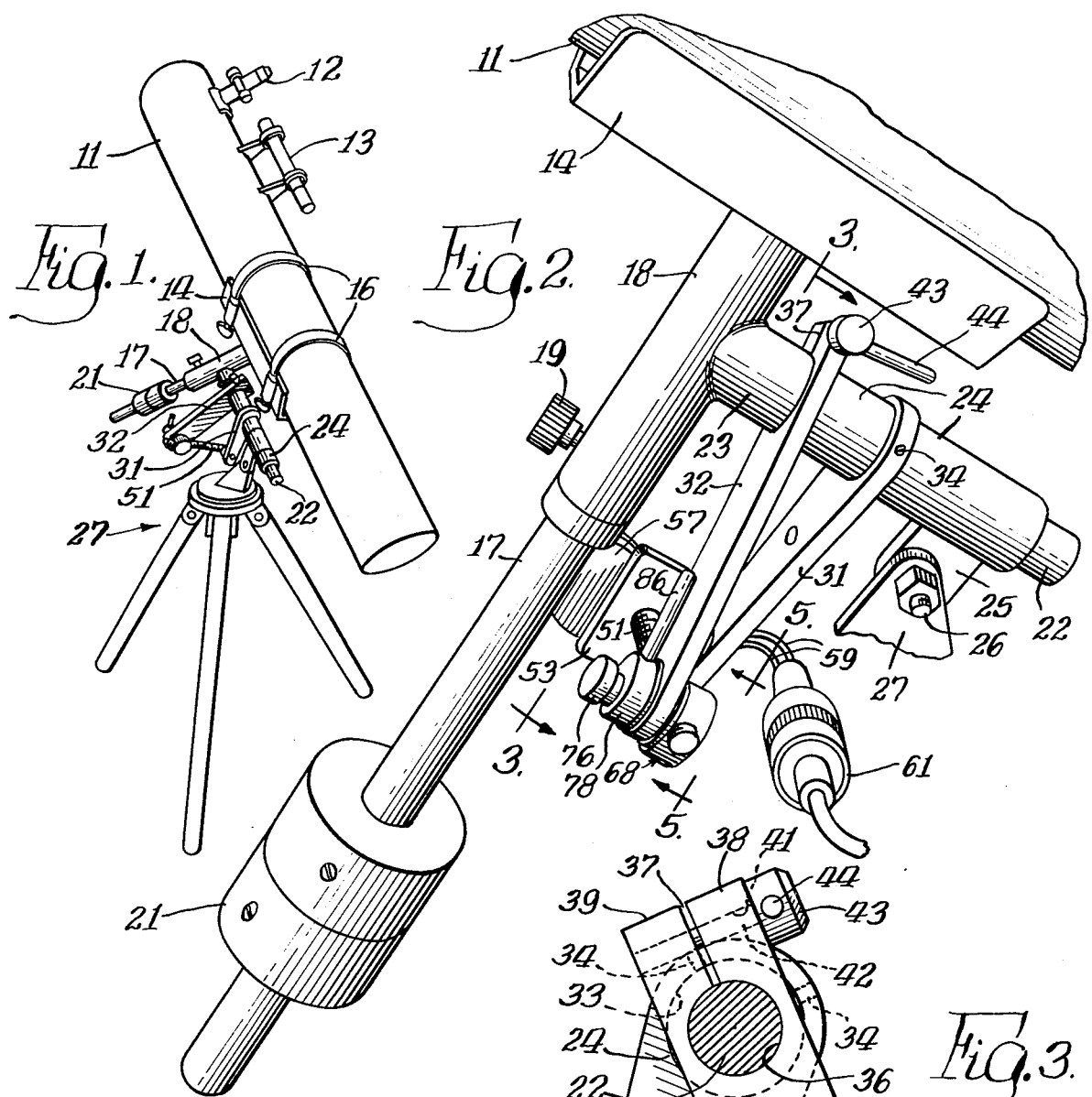
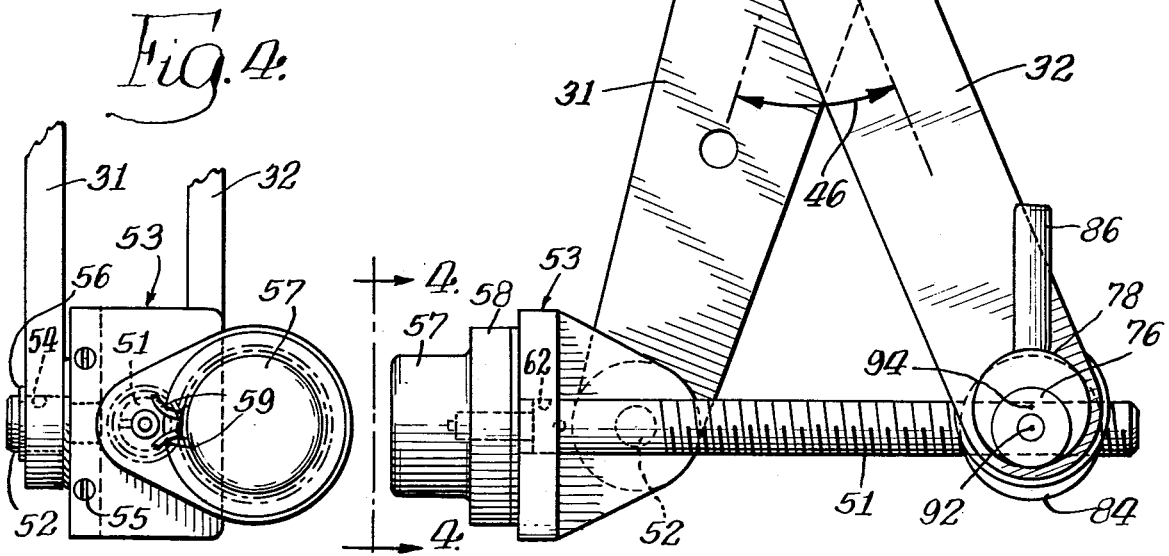

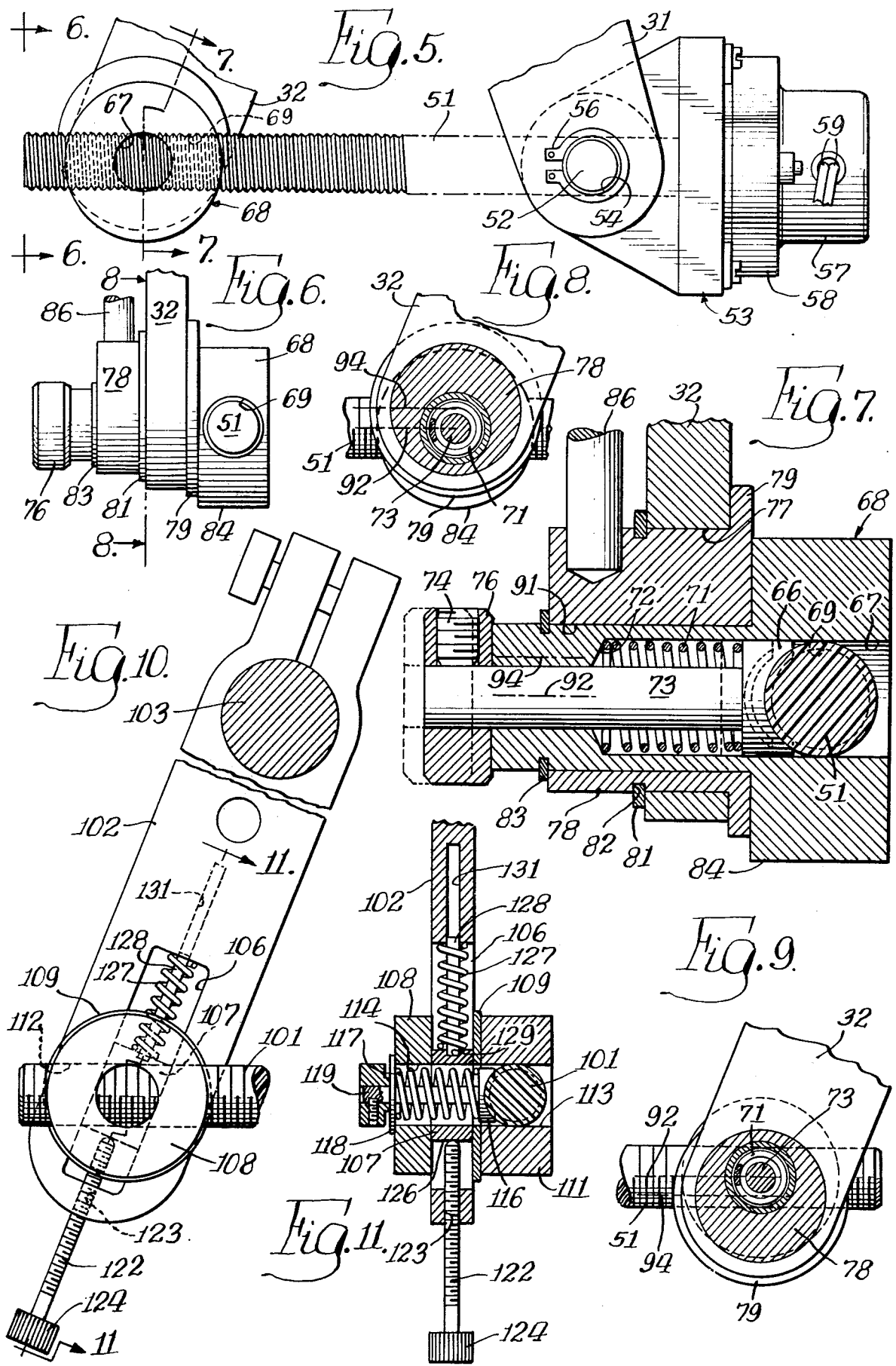

SIDEREAL RATE DRIVE MECHANISM FOR A TELESCOPE MOUNT

Numerous designs have been provided in the prior art for mounting telescopes. One well known type is referred to as an equatorial mount which includes a rotatable polar shaft, a stationary support for the polar shaft, a rotatable declination shaft which is secured to the telescope, and a member which is secured to the polar shaft and which rotatably supports the declination shaft. In use, the polar shaft is positioned with its axis in the direction of the north star, and the telescope if fixed on an object star, planet or moon by rotating it on the shaft axes to a certain position.

Because of the rotation of the earth, the polar shaft must be slowly rotated in order to hold the telescope fixed on the selected object, and both automatic and manual drive mechanisms have been provided for this purpose. The automatic devices have usually included a small motor, such as a mechanical clock work or a synchronous motor, which is secured to the stationary support and is connected through gears to the polar shaft for rotating the polar shaft at sidereal rate.

A prior art automatic drive mechanism of this character has a number of drawbacks. It is a relatively complicated and expensive mechanism which cannot readily be installed by an average amateur astronomer. In addition, to obtain the necessary torque to turn the polar shaft, a rather large diameter gear must be attached to the polar shaft. Further, it is often desirable to be able to make small changes in the rate of rotation to maintain a fix on a planet or the moon and this is relatively difficult or not possible with conventional mechanisms.

It is therefore a general object of the present invention to provide a drive mechanism for a telescope mount, which avoids the foregoing disadvantages.

A drive mechanism in accordance with the present invention is designed for use in an equitorial telescope mount having a polar axis member, a polar support means for rotatably supporting said polar axis member, a declination axis member, a support means secured to said polar axis member and rotatably supporting said declination axis member, said drive mechanism comprising a first arm secured to and extending outwardly from said polar axis member, a second arm secured to and extending outwardly from said polar support means, and drive means connected to said first and second arms for changing the angle between said first and second arms at approximately the sidereal rate.

The drive means preferably comprises a screw member which extends between said arms and has a thread connection with the outer end of one of said arms, and a constant speed motor connected to turn said screw member.

Another feature of the mechanism resides in a manually operable device for changing the effective length of one of said arms, in order to make adjustments in the rate of angular displacement between said arms.

The foregoing and other objects and advantages of the present invention will become apparent from the following detailed description taken in conjunction with the accompanying figures of the drawings, wherein:

FIG. 1 is a perspective view of a telescope and mount, including a drive mechanism embodying the invention;

FIG. 2 is an enlarged perspective view of a portion of a portion of the structure shown in FIG. 1;

FIG. 3 is a still further enlarged sectional view taken on the line 3—3 of FIG. 2;

FIG. 4 is a view taken on the line 4—4 of FIG. 3;

FIG. 5 is an enlarged sectional view taken on the line 5—5 of FIG. 2;

FIG. 6 is a view taken on the line 6—6 of FIG. 5;

FIG. 7 is an enlarged sectional view taken on the line 7—7 of FIG. 5;

FIG. 8 is a sectional view taken on the line 8—8 of FIG. 6;

FIG. 9 is a view similar to FIG. 8 but illustrating different positions of some of the parts;

FIG. 10 illustrates an alternate form of the adjustment mechanism; and

FIG. 11 is a sectional view taken on the line 11—11 of FIG. 10.

The apparatus illustrated in FIG. 1 comprises a telescope including a tube 11, an eye piece 12 and a finder 13. The tube 11 is supported by a cradle 14 to which it is secured by two straps or clamps 16. The cradle 14 in turn is supported by a declination shaft 17 which is rotatably mounted in the T-shaped support 18. The declination shaft 17 extends entirely though an opening formed through the cross-bar of the T of the support 18, and bearings may be included so that the shaft 17 may be turned smoothly in the support 18. A set screw 19 (FIG. 2) is preferably provided in the support 18 so that the shaft 17 may be held at a selected position in the support 18. One or more counterweights 21 are preferably also secured to the outer end of the declination shaft 17 in order to counterbalance the weight of the telescope.

The mount for the telescope further includes a polar shaft 22 which extends perpendicularly to the declination shaft 17. The polar shaft 22 extends into an opening formed in a part 23 of the T-shaped support 18 (FIG. 2), and the polar shaft 22 is rigidly secured to the support 18. The polar shaft 22 in turn is supported by a support sleeve 24, which may include bearings, and a lug 25 is secured to and extends radially outwardly from the outer surface of the sleeve 24. The lug 25 is secured by a bolt 26 to the upper end of a tripod 27 (FIG. 1), which provides a portable support for the telescope.

As is well known in the field of astronomy, to view an object, such as a planet, the tripod 21 is positioned on a firm support and the polar shaft 22 is positioned with its axis substantially in line with the north or polar star. The positions of the tube 11 and the declination shaft 17 are then adjusted until the astronomer, using the finder 13, has the tube 11 fixed on the object. The object may then be viewed by looking through the eye piece 12.

Because of the rotation of the earth on its polar axis, a star will slowly move out of the field of view of the telescope unless the telescope is slowly moved to compensate for the earth's movement. Such compensating movement is particularly needed if photography is attempted. The rate of such movement, which is known as the sidereal rate, is fifteen degrees per hour. However, when viewing the moon or a planet, a rate slightly different from sidreal rate is needed to keep the object centered in the field of view, as is well known.

The above movement at the sidereal rate is accomplished by a drive mechanism in accordance with the present invention which is designed to slowly turn the polar shaft 22 relative to the sleeve 24 at the rate necessary to produce approximately one revolution per day. The drive mechanism comprises a first arm 31 which has one end secured to the sleeve 24 and extends outwardly therefrom, and a second arm 32 which has one end secured to the polar shaft 22 and also extends outwardly therefrom. The first arm 31 has a relatively large circular hole 33 (FIG. 3) formed therethrough which is positioned over the outer surface of the sleeve 24. Two or more set screws 34 are threadedly fastened in holes formed in the first arm 31 around the sleeve 24 and, when screwed inwardly, tightly secure the first arm 31 to the sleeve 24. The second arm 32 also has a circular opening 36 formed therein which is positioned around the polar shaft 22. The wall of the second arm 32 adjacent the opening 36 is split as indicated at 37 to form two halves 38 and 39. Coaxial holes 41 are formed in the two halves 38 and 39, and the hole in the half 39 is threaded. A screw 42 is positioned through the hole 41 in the half 38 and is screwed into the threaded hole 41 of the half 39, the hole in the half 38 being large enough to permit the screw 42 to move freely therein. A cap 43 is rigidly secured to the outer end of the screw 42, and therefore when the cap 43 is turned, as by turning a pin 44, the screw 42 is screwed into the hole of the half 38 and the two halves 38 and 49 are forced together. This operation of course reduces the diameter of the hole 36 and therefore tightens the second arm 32 on the polar shaft 22. As is best shown in FIG. 3, when the two arms 31 and 32 are secured to the sleeve 24 and to the polar shaft 22, respectively, they are adjusted to make an angle therebetween, this angle being indicated in FIG. 3 by the reference numeral 46.

Since the arms 31 and 32 are rigidly secured to the sleeve 24 and to the shaft 22, it will be evident that the shaft 22 may be rotated within the sleeve 24 by moving the outer ends of the arms 31 and 32 to change the angle 46. Such a change is accomplished by drive means including a motor driven elongated screw 51. With reference to FIGS. 3, 4 and 5, the outer end of the arm 31 is pivotally fastened to a pin 52 which is secured to an angle-shaped bracket 53. The bracket may be formed by two flat plates which are secured together by screws 55 to form a right angle. The pin 52 is positioned in a hole 54 formed in the outer end of the arm 31, and a snap-ring 56 holds the arm 31 on the pin 52. Thus, the arm 31 is able to freely pivot relative to the pin 52 and to the bracket 53. On the other side of the bracket 53 is mounted a constant speed motor 57, such as a synchronous electric motor of the character used in clocks. The motor 57 is drivingly connected to the screw 51 through a gear train contained in a gear box 58. Wires 59 and a plug 61 (FIG. 2) are provided to connect the motor 57 to a supply of electricity. The end of the screw 51, which is adjacent the arm 31 is rotatable in a hole 62 (FIG. 3) formed in the bracket 53, and this end of the screw 51 is connected to the output shaft of the gear train. Thus, when the electric motor 57 is energized, it slowly rotates the screw 51 but the screw 51 cannot move along its axis relative to the arm 31.

The other end of the screw 51 extends adjacent the outer end of the second arm 32 and is threadedly connected to the arm 32, thereby causing the arm 32 to move when the screw 51 is rotated. The pitch of the threads of the screw 51, the speed of the electric motor and the amount of the speed reduction of the gears in the box 58 and the effective lengths of the arms 31 and 32, are such that the arms 31 and 32 are moved in order to rotate the shaft 22 relative to the sleeve 24 at about the sidereal rate. The effective length of the arm 32 is adjustable in order to vary the rate enough for viewing the moon, planets and other such objects.

The screw 51 is connected to the second arm 32 by means of a threaded half-nut 66 (FIG. 7) which is moveably mounted in a hole 67 formed in a holder 68. A second hole 69 is formed in the holder 68, which extends transversely of the hole 67, and the screw 51 extends loosely through the hole 69. However, when the threaded half-nut 66 is pressed against the screw 51, as shown in the full line position of the nut in FIG. 7, the screw 51 is prevented from sliding through the holder 68. The half-nut 66 is pressed against the screw 51 by means of a compression spring 71 which is also positioned in the hold 67 between the half-nut 66 and a shoulder 72 formed interiorly of the hole 67. A pin 73 extends through the hole 67 and the spring 71. The pin 73 is secured to the half-nut 66, and at the outer end, the pin 73 is secured by a set screw 74 to a knob 76. The compression spring 71 urges the half-nut 66 toward the right as seen in FIG. 7 and into threaded engagement with the screw 51. However, the half-nut 66 may be disengaged from the threads of the screw 51 by grasping the knob 76 and pulling toward the left as seen in FIG. 7 against the force of the compression spring 71 in order to move the half-nut 66 out of engagement with the screw 51, as shown by the dashed line position in FIG. 7. The position of the screw 51 relative to the arm 32 may therefore be quickly adjusted when desired.

The holder 68 is fastened to the arm 32 by forming a circular hole 77 adjacent the outer end of the arm 32, mounting the holder 68 in a sleeve 78, and positioning the sleeve 78 in the opening 77 (FIG. 7). The sleeve 78 is held in place in the arm 32 by means of a flange 79 formed on the sleeve 78 on one side of the arm 32, and by a snap-ring 81 positioned in a groove 82 formed in the sleeve 78 on the other side of the arm 32. The sleeve 78 in turn is connected to the holder 68 by being positioned between still another snap-ring 83 connected to the holder and an enlarged part 84 of the holder 68. A pin 86 is secured to and extends radially outwardly from the outer surface of the sleeve 78 to enable the sleeve 78 to be manually turned. The connection between the sleeve 78 and the adjoining parts is such that the sleeve 78 may be rotated relative to the arm 32 and to the holder 68. There is however a snug fit between the arm 32 and the sleeve 78.

It will be apparent that when the motor 57 is energized and the half-nut 66 engages the screw 51, the screw 51 will slowly turn and will move the arms 31 and 32 relative to each other. The direction of rotation of the screw 51 is such that the outer ends of the arms are moved together when the motor 57 is energized. The angle 46 decreases and the half-nut 66 swings in an arc about the axis of the polar shaft 22 (FIG. 3).

As previously mentioned, the rate at which the angle 46 changes when the motor 57 is energized is a function, among other things, of the effective lengths of the arms 31 and 32. The effective length is defined herein as the distance from the axis of the polar shaft 22, to the intersection between the screw 51 and the longitudinal centerlines of the two arms 31 and 32. It will be apparent therefore that the rate of change of the angle 46 may be changed by adjusting the effective length of one or both of the arms 31 and 32, and this feature is utilized as will be described to produce the different rates necessary for the moon, planets and stars.

In the form of the invention illustrated in FIGS. 1 through 9, this adjustment is accomplished by an eccentric arrangement. The adjoining surfaces of the hole 77, the sleeve 78 and the holder 68 are circular in cross-section. However, the axis of the hole 91 formed in the sleeve 78, which receives the holder 68, is offset or eccentric from the axis of the hole 77. With specific reference to FIGS. 7 and 8, the axis of the hole 91, which coincides with the axis of the pin 73, is indicated by the reference numeral 92, and the axis of the hole 77 is indicated by the reference numeral 94. It will be noted that the axes 92 and 94 are displaced or eccentric relative to each other, and consequently, when the sleeve 78 is turned in the hole 77 relative to the arm 32, such turning movement being accomplished by manually turning the pin 86, the axis 92 will swing about the axis 94. Therefore, the position of the axis 92 and the centerline of the screw 51, which intersects the axis 92, will be displaced relative to the arm 32. With specific reference to FIG. 3, if the sleeve 78 is rotated or turned, the holder 68 will remain in fixed position relative to the screw 51 but the axis 92 will swing in a circular movement around the axis 92 and will be displaced along the length of the arm 32. Such displacement results in a change in the effective length of the arm 32.

In the positions of the parts illustrated in FIGS. 3, 7 and 8, the axis 92 is displaced nearly the maximum distance downwardly from the axis 94, and the effective length of the arm 32 is nearly at maximum. If the sleeve 78 is turned in either direction, the axis 92 will swing and the effective length of the arm 32 will shorten. The position of the parts shown in FIG. 9 illustrates the point where the axis 92 is displaced 180° from the position illustrated in FIG. 3 and the effective length of the arm 32 is at nearly its minimum length. The foregoing adjustment will also result in a small change in the angle 46.

After the sleeve 78 has been manually placed at a desired angular position, it will remain in this position until a further manual adjustment is made. This is accomplished by providing a relatively tight or snug fit between the outer surface of the sleeve 78 and the hole 77 in the arm 32, or by making the snap-ring 81 in a dished form so that it will apply a spring force against the arm 32 and thus retard turning movement of the sleeve 78 relative to the arm 32.

While the arrangement illustrated in FIGS. 1 through 9 accomplishes the purpose of providing a small adjustment away from sidereal rate, it has a disadvantage in that the turning movement of the sleeve 78 results in pivoting movement of the axis 92 relative to the centerline of the arm 31. The form of the invention illustrated in FIGS. 10 and 11, which is the preferred form, eliminates this disadvantage, and the form of the invention illustrated in FIGS. 10 and 11 also has a simpler construction. Only the part of the assembly including the thread connection between the screw and an arm is illustrated in FIGS. 10 and 11. The other parts may be identical with the corresponding parts illustrated in FIGS. 1 through 9.

This form of the invention includes an arm 102 which corresponds to the arm 32 and is secured to a polar shaft 103. The arm 102 has an elongated slot 106 formed therein, the long dimension of the slot extending in the direction of the longitudinal centerline of the arm 102. A rectangular slide member 107 is positioned in the slot 104, and the thickness of the slide member 107 is approximately the same as that of the arm 102. Positioned on opposite sides of the slide member 107 and abutting the opposite sides of the arm 102 are a pair of circular flat washers 108 and 109, the washers being secured to the member 107. On the outer surface of the washer 109 is secured a ring-shaped holder 111 which has a diametrically extending passage 112 formed therein that loosely receives a screw 101. The holder 111 further includes an axial passage 113 which is coaxial with passages 114 formed through the two rings 108 and 109 and through the slide member 107.

In the passage 114 on the side of the screw 101, which is adjacent the arm 102 is positioned a threaded half-nut 116 which threadedly engages the screw 101. The half nut 116 is pressed against the screw 101 by a compression spring 117 which extends through the passage 114 between the half-nut 116 and a washer 118. The washer 118 is positioned on the outer surface of the washer 108 and is secured thereto. A pin or small shaft 119 is positioned through the spring 117 and has one end secured to the half-nut 116. The other end of the pin 119 is secured to a knob 121 which is positioned on the outside of the washer 118. By manually pulling the knob against the force of the compression spring 117, the half-nut 116 may be moved out of engagement with the screw 101 in order to permit rapid adjustment of the screw 101 relative to the arm 102. Thus, the arrangement provides for rapid or instant adjustment of the angle between the two arms.

The effective length of the arm 102 is the distance from the axis of the polar shaft 103 and the centerline of the hole 114 which intersects the axis of the screw 101. This distance may be adjusted for the reasons previously mentioned by turning a screw 122 which is located at the outer end of the arm 102 and extends in the direction of the length of the arm 102. The screw 122 is located in a threaded hole 123 formed at the outer end of the arm 102, and a knob 124 is formed on the outer end of the screw 122. The inner end 126 of the screw 122 is rounded and engages the outer surface of the slide member 107. On the inner surface of the slide member 107, which is the surface adjacent the polar shaft 103, a compression spring 127 is positioned between the slide member 107 and the inner end surface of the slot 106. Thus, the compression spring 127 urges the slide member 107 away from the polar shaft 103, but of course such movement is prevented by the screw 122. A pin 128 is positioned through the compression spring 127 in order to hold the compression spring 127 in place, one end of the pin 128 being positioned in a recess 129 formed in the slide member 107 and the other end of the pin 128 extending into an elongated hole 131 formed in the arm 102. Consequently, the positions of the slide member 107 and the screw 101 may be adjusted relative to the arm 102 by turning the screw 122 in order to change the effective length of the arm 102 and thus the rate of angular displacements between the arms.

It will be apparent from the foregoing description that a novel and useful construction has been provided. The lengths of the two arms 31 and 32 provide considerable leverage or torque so that the proper adjustment may be made by a relatively small electric motor and without the need for a large gear. For example, where the effective lengths of the two arms 31 and 32 are approximately six inches, they provide the same leverage as would a conventional twelve inch diameter gear arrangement. With an adjustment mechanism having the foregoing length of the arms, and using a synchronous motor and gearing which provides one-half revolution per minute of the screw 51, with a screw 51 (or 101) having twenty threads per inch, the angle between the two arms is changed at the rate of 15° per hour, which equals the sidereal rate. Further, the mechanism comprising the eccentric arrangement in the form shown in FIGS. 1 to 9, or the screw and slide member arrangement illustrated in FIGS. 10 and 11, provides for minor adjustments in the rate. If the effective length of the arm 32, or the arm 102, is shortened, the rate at which the angle 46 is changed is speeded up, and conversely when the effective length of the arm is lengthened, the rate of change of the angle is slowed down. Thus, the arrangement is able to be adjusted to differences in the lunar, planetary and other rates. The apparatus has a further advantage in that the half-nut arrangement which engages the screw 51 or 101 is readily disengageable so that the position of the screw relative to the arm 32, or the arm 102, may be quickly released, the screw positioned adjusted, and then the mechanism reset. With the constructions described herein, the time duration for which the adjustment mechanism will hold a telescope on an object is approximately two hours, but as previously mentioned, it can be instantly reset by moving the half-nut.

I claim:

1. A drive mechanism for a telescope mount, the mount including a polar axis member and a polar support member, said axis member being rotatably supported by said support member, said drive mechanism comprising a first elongated arm adapted to have one end portion thereof secured to said axis member, a second elongated arm adapted to have one end portion thereof secured to said support member, said first and second arms extending outwardly in different directions from said polar and support members and forming an angle therebetween, and drive means interconnecting the outer end portions of said first and second arms for moving said outer end portions relative to each other and thereby changing said angle at about the sidereal rate, and further including adjustment means connected to one of said arms and to said drive means for changing the distance from said polar axis member to said drive means.

2. A mechanism as in claim 1, wherein said adjustment means includes a screw connected between said one arm and said drive means for moving said drive means relative to said one arm upon turning movement of said screw.

3. A mechanism as in claim 1, wherein said adjustment means includes an eccentric member connected between said one arm and said drive means for moving said drive means relative to said one arm upon turning movement of said eccentric member.

4. A drive mechanism for a telescope mount, the mount including a polar shaft and a sleeve around said shaft for rotatably supporting said shaft, said drive mechanism comprising a first elongated arm having one end thereof adapted to be secured to said polar shaft, a second elongated arm having one end thereof adapted to be secured to said sleeve, said first and second arms extending outwardly from the axis of said polar shaft and the outer end portions of said first and second arms being spaced apart, an elongated screw extending between said outer end portions, a thread connection between said screw and one of said arms, and a constant speed motor drive for turning said screw and connecting said screw with the other of said arms, whereby turning movement of said screw upon energization of said motor drive results in said outer end portions being moved relative to each other and in turning movement of said polar shaft in said sleeve, and further including adjustment means between one of said arms and said screw for changing the distance from said axis of said polar shaft to said screw.

5. A mechanism as in claim 4, wherein said adjustment means comprises slide means for moveably mounting said thread connection on said one arm, an adjustable screw connecting said one arm and said slide means for moving said slide means in one direction on said one arm, and a spring connecting said one arm and said slide means for urging said slide means in the other direction.

6. A mechanism as in claim 4, wherein said adjustment means comprises eccentric means for rotatably mounting said thread connection on said one arm, said thread connection being eccentric from the axis of rotation.

7. A drive mechanism for a telescope mount, the mount including a polar axis member and a polar support member, said axis member being rotatably supported by said support member, said drive mechanism comprising a first elongated arm adapted to have one end portion thereof secured to said axis member, a second elongated arm adapted to have one end portion thereof secured to said support member, said first and second arms extending outwardly in different directions from said polar and support members and forming an angle therebetween, drive means interconnecting the outer end portions of said first and second arms for moving said outer end portions relative to each other and thereby changing said angle, the rate of change of said angle being a function of the effective lengths of said first and second arms and said effective length being the distance from said polar axis member to said drive means, and further including means connected to at least one of said arms for adjusting said effective length.

* * * * *